United States Patent
Hundley et al.

(10) Patent No.: US 11,104,096 B2
(45) Date of Patent: Aug. 31, 2021

(54) INTEGRATED FASTENER INSERT FOR OPEN CELLULAR SANDWICH STRUCTURE AND METHOD TO INSTALL

(71) Applicant: THE BOEING COMPANY, Chicago, IL (US)

(72) Inventors: Jacob Michael Hundley, Thousand Oaks, CA (US); Mark R. O'Masta, Oak Park, CA (US); Zak Charles Eckel, Malibu, CA (US); Alvin Escobar, Sherman Oaks, CA (US); Kenneth Cante, St. La Puente, CA (US); Tony Koung, Hacienda Heights, CA (US)

(73) Assignee: THE BOEING COMPANY, Chicago, IL (US)

( * ) Notice: Subject to any disclaimer, the term of this patent is extended or adjusted under 35 U.S.C. 154(b) by 216 days.

(21) Appl. No.: 16/117,676

(22) Filed: Aug. 30, 2018

(65) Prior Publication Data
US 2020/0070465 A1    Mar. 5, 2020

(51) Int. Cl.
*B32B 3/12*    (2006.01)
*B32B 27/06*    (2006.01)

(52) U.S. Cl.
CPC .............. *B32B 3/12* (2013.01); *B32B 27/065* (2013.01); *Y10T 428/20* (2015.01);
(Continued)

(58) Field of Classification Search
CPC ......... B32B 3/12; B32B 27/065; B32B 27/12; B32B 7/12; B32B 3/266; B32B 27/08;
(Continued)

(56) References Cited

U.S. PATENT DOCUMENTS

| 4,803,108 A | 2/1989 | Leuchten et al. |
| 5,240,543 A | 8/1993 | Fetterhoff et al. |

(Continued)

FOREIGN PATENT DOCUMENTS

| EP | 0264870 B1 | 8/1990 |
| EP | 0461299 B1 | 1/1996 |

(Continued)

OTHER PUBLICATIONS

Extended European Search Report for EP Application No. 19193842.2 dated Jan. 28, 2020.

*Primary Examiner* — Brian Handville
(74) *Attorney, Agent, or Firm* — Marshall, Gerstein & Borun LLP

(57) ABSTRACT

A sandwich structure configured to be secured with a mechanical fastener includes a core assembly, which includes a polymer component configured for supporting a mechanical fastener connector insert. The core assembly further includes an open cellular component formed from a plurality of self-propagating photopolymer waveguides positioned around the polymer component, wherein a first portion of the plurality of self-propagating photopolymer waveguides is secured to and extends from the polymer component. Further included is a first face sheet secured to a first side of the core assembly, wherein the first portion of the plurality of self-propagating photopolymer waveguides has a distal end spaced apart from the polymer component and secured to the second face sheet.

21 Claims, 13 Drawing Sheets

(52) U.S. Cl.
CPC .......... *Y10T 428/24149* (2015.01); *Y10T 428/24273* (2015.01); *Y10T 428/24298* (2015.01)

(58) Field of Classification Search
CPC .. B32B 3/08; B32B 3/06; B32B 3/085; B32B 2250/40; B32B 2260/046; B32B 2260/021; B32B 2262/101; B32B 2605/08; B32B 2605/18; Y10T 428/24149; Y10T 428/20; Y10T 428/24298; Y10T 428/24273; B26F 1/00; B26F 3/00; B29C 65/48; B29C 65/7802
See application file for complete search history.

(56) References Cited

U.S. PATENT DOCUMENTS

| | | | |
|---|---|---|---|
| 5,445,861 A | 8/1995 | Newton et al. | |
| 7,382,959 B1 * | 6/2008 | Jacobsen | B82Y 20/00 385/129 |
| 7,653,279 B1 | 1/2010 | Jacobsen | |
| 9,005,730 B2 | 4/2015 | Patel et al. | |
| 9,376,074 B2 | 6/2016 | Hundley et al. | |
| 9,457,537 B1 | 10/2016 | Hundley et al. | |
| 9,511,540 B2 | 12/2016 | Mankame et al. | |
| 9,751,287 B2 | 9/2017 | Hundley et al. | |
| 2013/0143060 A1 * | 6/2013 | Jacobsen | B29C 35/0894 428/594 |
| 2016/0039168 A1 | 2/2016 | Mankame et al. | |
| 2016/0089817 A1 | 3/2016 | Hundley et al. | |
| 2017/0080673 A1 * | 3/2017 | Schaedler | C23F 1/00 |
| 2017/0137955 A1 | 5/2017 | Hofmann et al. | |
| 2017/0144361 A1 | 5/2017 | Hills et al. | |

FOREIGN PATENT DOCUMENTS

| | | | |
|---|---|---|---|
| WO | WO-2004063572 A2 | 7/2004 | |
| WO | WO-2009083645 A1 | 7/2009 | |
| WO | WO-2016100410 A1 * | 6/2016 | ............ B32B 15/20 |

\* cited by examiner

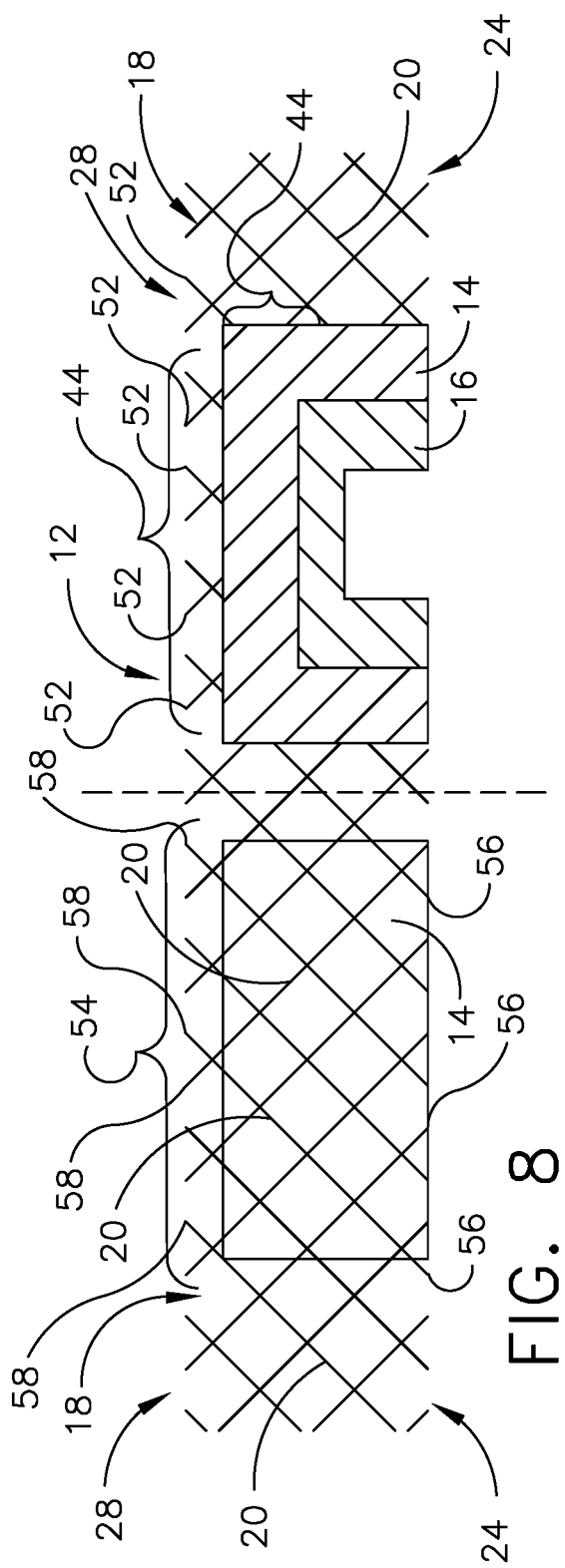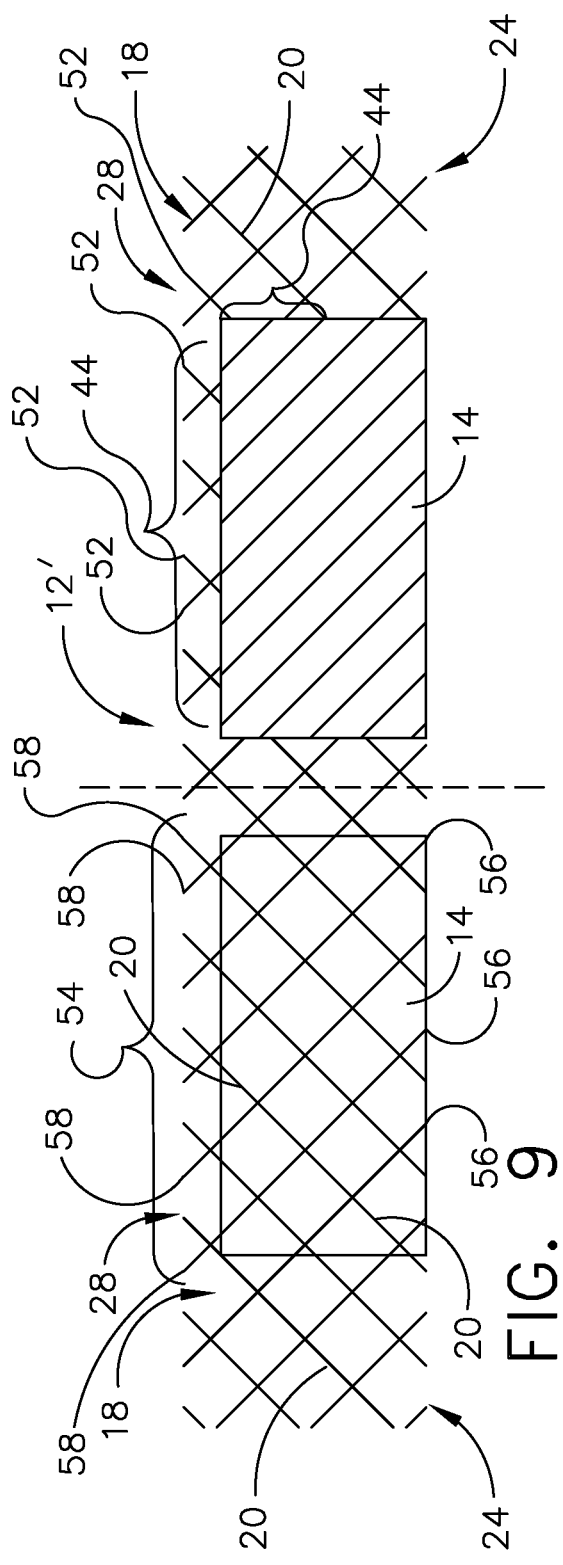

INTEGRATED FASTENER INSERT FOR OPEN CELLULAR SANDWICH STRUCTURE AND METHOD TO INSTALL

FIELD

The present disclosure relates to sandwich core structures and, more particularly to embedding fastener connectors in open cellular sandwich structures.

BACKGROUND

Sandwich structures, which consist of two thin and stiff face sheet materials separated by a lightweight core are widely utilized in advanced aerospace and automotive designs owing to their high specific strength and stiffness. Advances have been made to sandwich structures, which provide further structural efficiency benefits incorporating open cellular architected core material. The open cellular core structure differs from more traditional core reinforcement materials such as balsa, honeycomb or closed cell foam in that they have high structural mass efficiency and the open cellular core permits air or fluid flow in all directions within the plane of the sandwich. Such open cellular core materials furthermore enable multi-functional sandwich designs in which the structural role of the sandwich can be combined with additional functionality, such as acoustic isolation and active heating and cooling.

In taking advantage of these benefits, it is necessary to integrate sandwich constructions into surrounding structures or subsystems. Typically, this integration is accomplished by way of a series of mechanical fasteners between the sandwich structure and host structure or subsystem. In the past, sandwich designs, which required fasteners for integration to surrounding structures or systems, suffered from a number of drawbacks. Typical methods of integrating a mechanical fastener connector or attachment feature into a sandwich structure relied upon machining a hole in or through the structure. This can cause considerable damage to the core to the detriment of its intended performance. The mechanical fastener connector insert is typically installed within the hole to aid in transferring the load from the fastener to the sandwich structure. An adhesive or frictional mechanism is implemented to prevent the mechanical fastener connector fastener from being pulled out during use. Frictional mechanisms rely upon the poor shear resistance offered by the core and adhesive mechanisms create difficulty in quantifying failure load due to the variability in adhesive application. If securement of the mechanical fastener connector insert is not used and instead the fastener is directly coupled to the sandwich structure, a large limitation exists to fastener pull-out resistance given the localization of the load to the core, which has a poor shear strength.

In other applications, a mechanical fastener connector was positioned within the core of the sandwich structure. In that application, the mechanical fastener connector was positioned within a reservoir of photopolymer and self-propagating photopolymer waveguides were formed around the mechanical fastener connector within a photopolymer reservoir. With the mechanical fastener positioned within the open cellular construction of the core, the sandwich structure was completed by securing a first and second face sheets to the assembly of the mechanical fastener connector and open cellular construction. The mechanical fastener connector was secured within the core of the sandwich structure with self-propagating photopolymer waveguides positioned against the mechanical fastener connector structure, which would include a polymer against a metal mechanical fastener connector. There was a need for an enhanced securement between the mechanical fastener connector than that provided by the self-propagating photopolymer waveguides. Furthermore, the load transfer to the sandwich panel is dependent upon the interfacial area formed between the mechanical fastener connector and the face sheets as well as the poor shear strength between the mechanical fastener connector and the core.

Based on these limitations of fastening methods, there exists a need to develop apparatus and methods for introducing mechanical fastener connectors into a sandwich structure and more particularly to a sandwich structure with a cellular open core. There is also a need to reduce the number of manufacturing steps and parts in adapting the sandwich structure to secure a fastener as well as imparting unnecessary damage to the core. There is further need for efficient load transfer between the fastener and the sandwich structure, as well as a need to improve upon securement with self-propagating photopolymer waveguides positioned onto mechanical fastener connectors within the sandwich structure. In addition, there is a need to provide for a simplified method for fastening components with complex curvature, since the threaded inserts or standoffs grown directly into the core maintain their orientation normal to the curvature of the face sheets.

SUMMARY

An example includes a sandwich structure configured to be secured with a mechanical fastener includes a core assembly, which includes a polymer component configured for supporting a mechanical fastener connector insert. The core assembly further includes an open cellular component formed from a plurality of self-propagating photopolymer waveguides positioned around the polymer component, wherein a first portion of the plurality of self-propagating photopolymer waveguides is secured to and extends from the polymer component. Further included is a first face sheet secured to a first side of the core assembly and a second face sheet secured to a second side of the core assembly, wherein the first portion of the plurality of self-propagating photopolymer waveguides has a distal end spaced apart from the polymer component and secured to the second face sheet.

An example includes a method for fabricating a sandwich structure for securement with a mechanical fastener, which includes the step of forming a core assembly including forming a polymer component configured for supporting a mechanical fastener connector insert and forming a plurality of self-propagating photopolymer waveguides, wherein as a result the core assembly comprises a first portion of the plurality of the self-propagating photopolymer waveguides being secured to and which extends from the polymer component. The method further includes a step of securing a first face sheet to a first side of the core assembly and further includes a step of securing a second face sheet to a second side of the core assembly which includes securing the second face sheet to distal ends of the first portion of the plurality of the self-propagating photopolymer waveguides, wherein the distal ends of the first portion are spaced apart from the polymer component.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 8 is a side elevation and split cross section view of the core assembly fabricated in FIG. 6 with the two polymer components with mechanical fastener connector inserts and the open cellular component formed around polymer components wherein the side elevation view is positioned on the left side of the dashed line and the cross section view is positioned on the right side of the dashed line;

FIG. 9 is a side elevation and split cross section view of the core assembly fabricated in FIG. 7 with the two polymer components and the open cellular component formed around polymer components wherein the side elevation view is positioned on the left side of the dashed line and the cross section view is positioned on the right side of the dashed line;

DESCRIPTION

Examples of improved sandwich structure configured to be secured with a mechanical fastener and method for fabricating a sandwich structure for securement with a mechanical fastener will be discussed and shown. Mechanical fasteners employed to secure to a sandwich structure to secure the sandwich structure to another structure or subsystem, may be selected from a wide variety of mechanical fasteners. Such mechanical fasteners can be selected from bolts, rivets, screws, threaded rods, pins, anchors, fastener inserts, wire thread inserts and snap-in fasteners and the like of mechanical fasteners. A mechanical fastener selected by a fabricator will have a corresponding compatible mechanical fastener connector insert positioned and secured within a polymer component, as will be herein described. The polymer component with the mechanical fastener connector insert will be secured within a sandwich structure with the sandwich structure having an open cellular component within its core.

Figure 1:
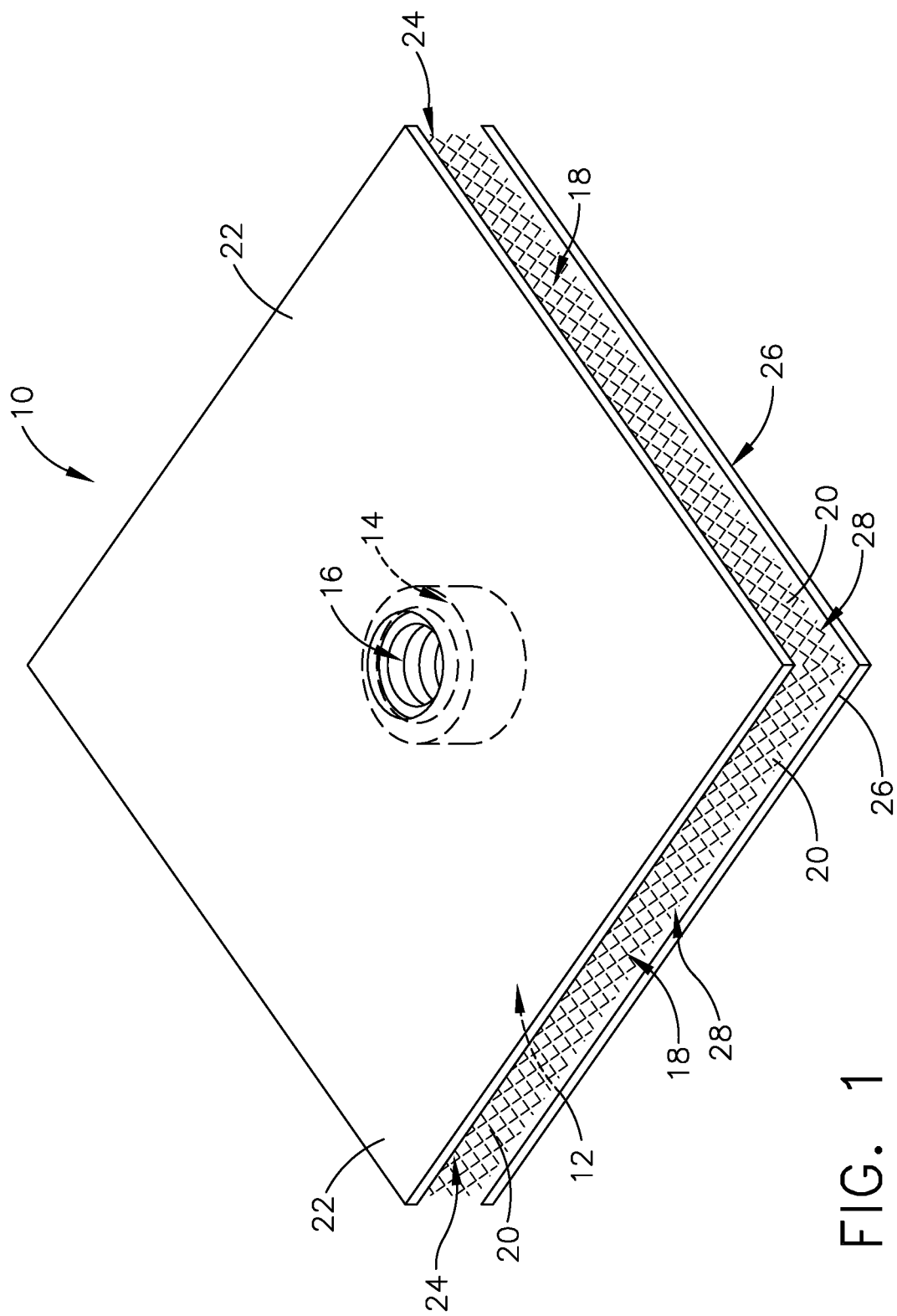
FIG. 1 is a perspective view of an assembled sandwich structure with a mechanical fastener connector insert secured within the sandwich structure.

As seen in FIG. 1, an assembled section of sandwich structure 10 for securing with a mechanical fastener is shown. Sandwich structure 10 has core assembly 12, which will be discussed in further detail herein, which includes polymer component 14 for supporting mechanical fastener connector insert 16 positioned and secured within sandwich structure 10. Core assembly 12 further includes an open cellular component 18 formed for example from a plurality of self-propagating polymer waveguides 20 grown from photopolymerizable resin using controlled two dimensional ("2-D") ultraviolet ("UV") light source exposure. Any UV-curable photomonomer or blend thereof, for example, which displays self-propagation can be used to form this truss or lattice architecture. Grown waveguides 20 form a microtruss structure within sandwich structure 10 forming a three-dimensional network of self-propagating photopolymer waveguides 20 can be employed and examples are shown in U.S. Pat. Nos. 7,382,959 and 7,653,279. Sandwich structure 10 further includes first face sheet 22 secured to first side 24 of core assembly 12 and second face sheet 26 secured to second side 28 of core assembly 12.

First and second face sheets 22, 26 can be constructed from a wide variety of materials. For example, glass fiber reinforced plastic ("GFRP") composites can be used to form first and second face sheets 22, 26. The glass fiber may be continuous single plies, layered angled plies, a weave of tows or discontinuous tows. In some examples the composite will be in the form of a pre-preg where fibers are embedded within a thermoplastic or thermoset polymer. In some applications the polymer matrix of these face sheets is fully cured prior to formation of the open cellular component 18 or partially cured polymer matrices may be used as well. Other materials can be employed such as carbon fiber reinforced plastic ("CFRP") composites with either use of discontinuous or continuous fibers as well as aluminum alloys or any combination thereof. Both first and second face sheets 22, 26 can be composed of the same material or they may be composed of dissimilar materials. Dry fiber mats, weaves or knits may also be used followed by post-shaping infiltration step via a resin transfer method ("VARTM") or wet hand lay-up.

Figure 2:
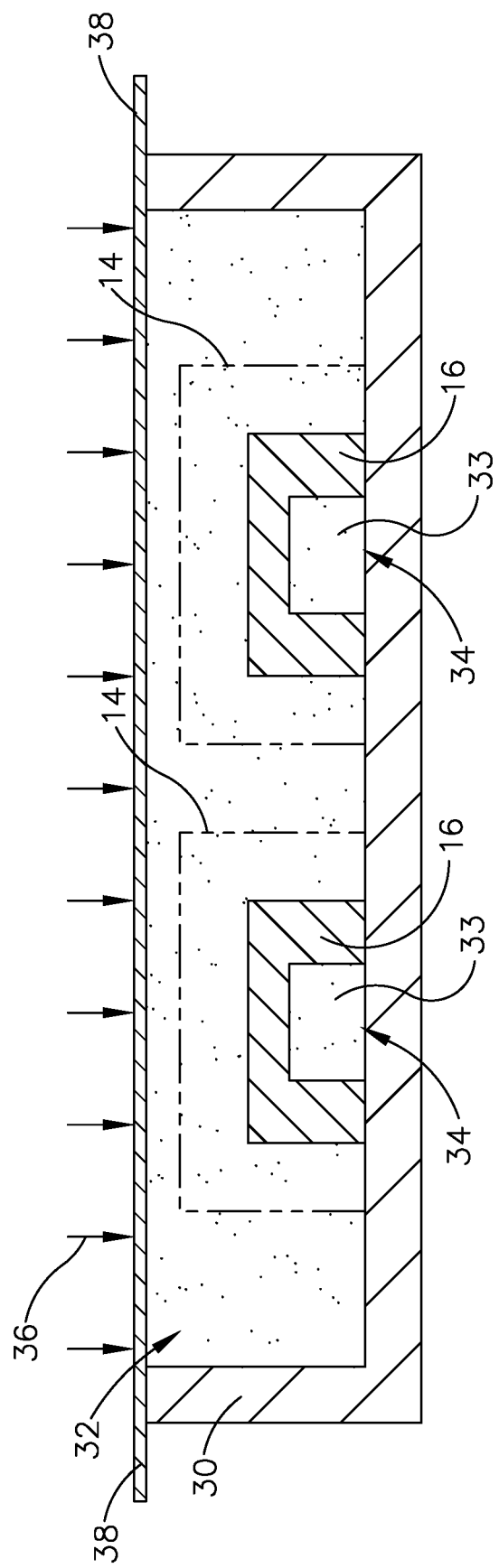
FIG. 2 is a cross section schematic view of fabrication of polymer components each encasing a mechanical fastener connector insert within a reservoir containing photopolymer.

Polymer component 14 for supporting mechanical fastener connector insert 16 of core assembly 12, as seen in FIG. 8, can be fabricated in various ways and securement of mechanical fastener connector insert 16 to polymer component 14 can be accomplished in various methodologies. A first example of constructing polymer component 14 as seen in FIG. 2 is constructed for core assembly 12 from photopolymer material or photopolymerizable resin 32. In this example, two polymer components 14 are being constructed. Polymer components 14 are made within reservoir 30 containing photopolymer 32, which can be selected from one of a wide variety of photopolymer compositions. Mechanical fastener connector inserts 16, can be selected from a wide variety of connector inserts, which are compatible with as mentioned above fasteners such as bolts, rivets, screws, threaded rods, pins, anchors, fastener inserts, wire thread inserts and snap-in fasteners and like mechanical fasteners. This would include a wide variety of fastener inserts, wire thread inserts and the like, so as to be compatible with corresponding mechanical fasteners selected by the fabricator for securing sandwich structure 10 to another structure or subsystem.

Mechanical fastener connector inserts 16 are position within reservoir 30 and submerged within photopolymer 32. Prior to submerging mechanical fastener connector insert 16 within photopolymer 32, a material 33, such as for example, grease, film or a non-stick coating is positioned within cavity 34 of mechanical fastener connector insert 16 to prevent resin ingress into the cavity which could lead to resin interfering with a connection surface within cavity 34 which is employed in securing with a mechanical fastener, such that in one example the resin could diminish the engagement of mechanical fastener threads with threads positioned within the cavity of mechanical fastener connector insert 16.

Figure 6:
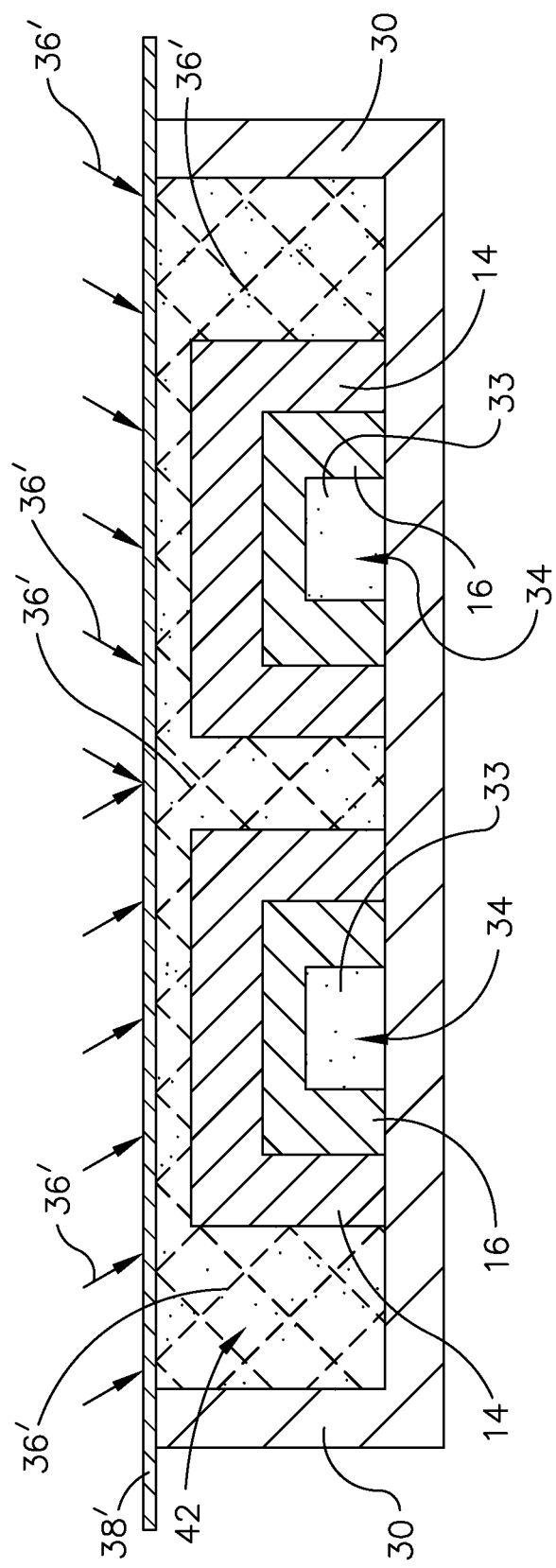
FIG. 6 is a cross section schematic view of a reservoir containing photopolymer and two polymer components each encasing a mechanical fastener connector insert and fabricating an open cellular component formed from a plurality of self-propagating photopolymer waveguides positioned around each of the polymer components.

With mechanical fastener connector insert 16 in place within reservoir 30, light 36 from a UV light source is exposed to mask 38, positioned overlying reservoir 30. Mask 38 has selectively positioned openings (not shown) in mask 38, which permit UV light 36 to enter reservoir 30 and cause photopolymer 32 to form a solid polymer in a location in which the UV light 36 is directed. In this example, opening(s) are positioned within mask 38 such that UV light 36 will cause photopolymer 32 to form a solid part such as polymer component 14 which encases mechanical fastener connector insert 16 for core assembly 12 as seen in FIG. 6. The positioning of openings in mask 38 can also direct UV light 36 to form a more porous structure of polymer component 14. Mechanical fastener connector insert 16 is encased within polymer component 14 and can be further secured within polymer component 14 with mechanical fastener connector insert 16 having roughened or irregular external surface(s) or otherwise having projections extending from mechanical fastener connector insert 16 which will provide mechanical resistance to mechanical fastener connector insert 16 from being pulled out of polymer component 14. Mechanical fastener connector insert 16 encapsulated within polymer component 14 is in this example to be the same as or less in thickness of the open cellular component 18.

Figure 3:
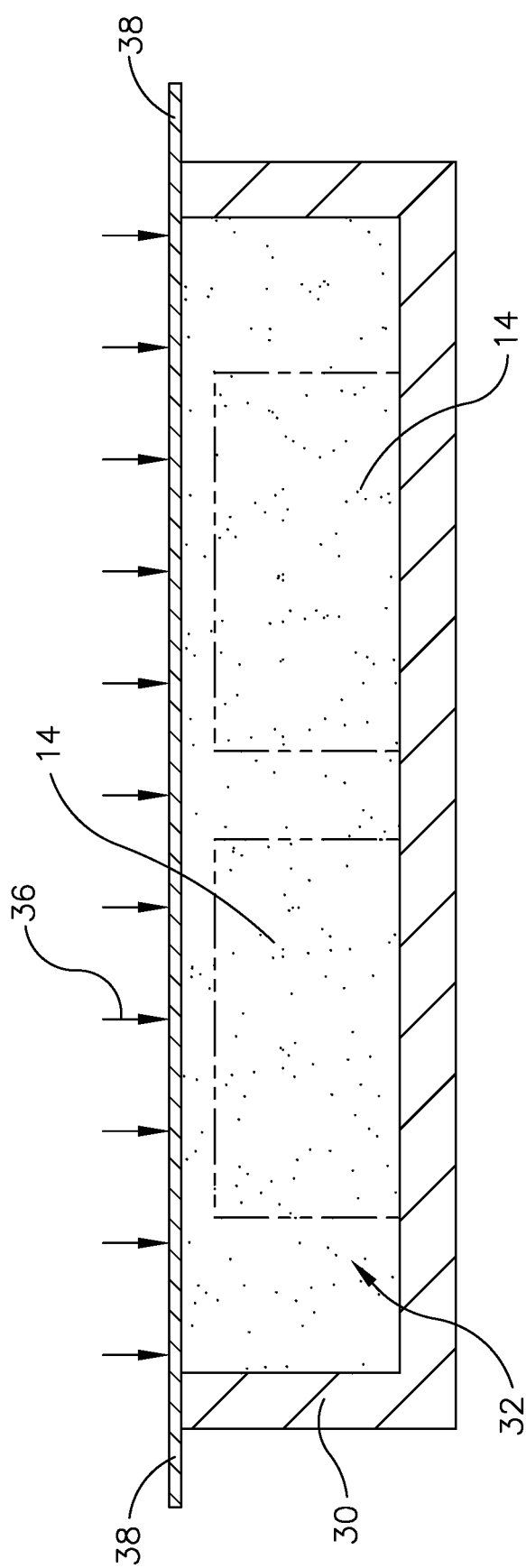
FIG. 3 is a cross section schematic view of fabrication of polymer components within a reservoir containing photopolymer.

In referring to FIG. 3, a second example of constructing polymer component 14 for supporting mechanical fastener connector insert 16 is shown for another example of core assembly 12' as seen in FIG. 9. Polymer component 14 can be fabricated from a photopolymer within reservoir 30 which contains photopolymer 32, as mentioned above. A solid or porous configuration of polymer component 14 can be constructed depending on the openings (not shown) positioned within mask 38 permitting UV light 36 from a UV light source to enter reservoir 30 creating or growing the structure of polymer component 14 within photopolymer 32. In this example, polymer component 14 is in a solid block formation. In this example of fabricating polymer component 14, mechanical fastener connector insert 16 will be later secured to polymer component 14 as will be discussed.

Figure 4:
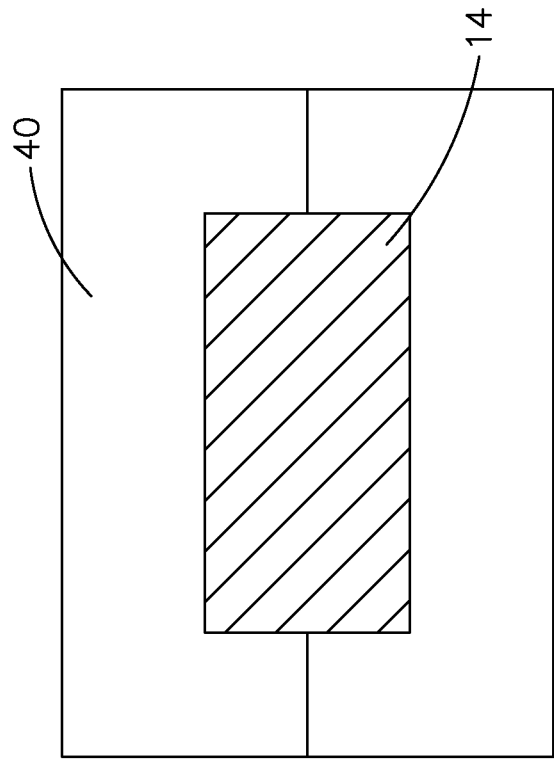
FIG. 4 is a cross section schematic view of fabrication within a mold of a mechanical fastener connector insert being encased within a polymer component.

In referring to FIG. 4, a third example of constructing polymer component 14 for supporting mechanical fastener connector insert 16 is shown for core assembly 12, as seen in FIG. 8, can also be fabricated within mold 40. Mechanical fastener connector insert 16 in this example is encased within polymer component 14 with polymer component 14 constructed of polymer being cured and formed within mold 40 with mechanical fastener connector insert 16 positioned within the polymer. In this example, polymer component 14 is fabricated and encases mechanical fastener connector insert 16 within an injector mold. Other types of molds can be selected to encase mechanical fastener connector insert 16 within polymer component 14. Again additional securement of mechanical fastener connector insert 16 can be attained with providing roughened or irregular surfaces to mechanical fastener connector insert 16 or otherwise providing projections which extend away from mechanical fastener connector insert 16 that will provide shear resistance and resist mechanical fastener connector insert 16 from being pulled out of polymer component 14. In an alternative example, first face sheet 22 could be positioned within mold 40 securing first face sheet to polymer component 14 at the time mechanical fastener connector insert 16 is being encased to polymer component 14.

Figure 5:
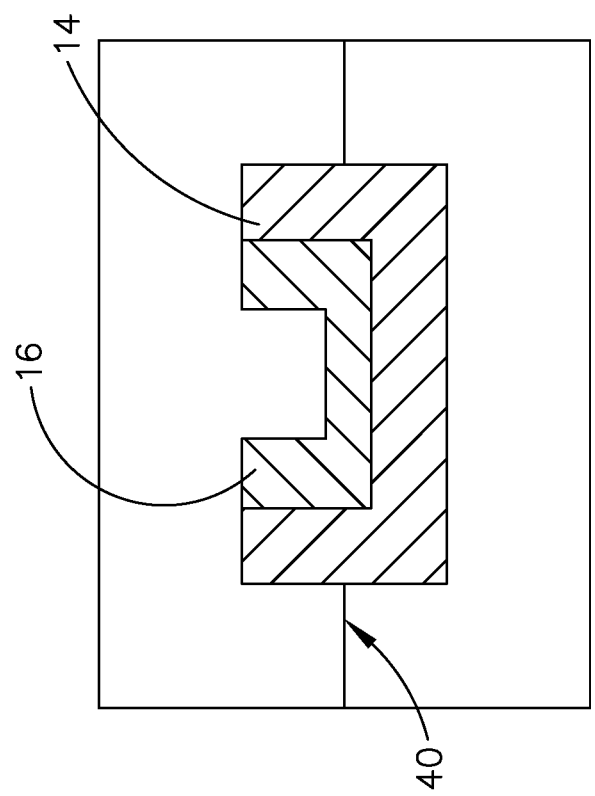
FIG. 5 is a cross section schematic view of fabrication within a mold of a polymer component.

In referring to FIG. 5, a fourth example of constructing polymer component 14 for supporting mechanical fastener connector insert 16 is shown for core assembly 12', as seen in FIG. 9, is similarly fabricated within mold 40. In this example, polymer component 14 is formed in a solid block formation within an injection mold. Various other mold methodologies can be applied. In this example of fabricating polymer component 14, mechanical fastener connector insert 16 will be secured to polymer component 14 at a later time as will be herein described. In an alternative example, as similarly mentioned above, first face sheet 22 could be positioned within the mold 40 securing first face sheet to polymer component 14. In other examples, mechanical fastener connector insert 16 is positioned within a mold with thermosetting resin. The resin would cure and encase mechanical fastener connector insert 16 and the outer shape of polymer component 14. The outer shape of a mold provides precise control over the size which is beneficial for enhancing load dispersion in regions where large fastener loads are expected as well as controlling the mass for weight sensitive applications.

Figure 10:
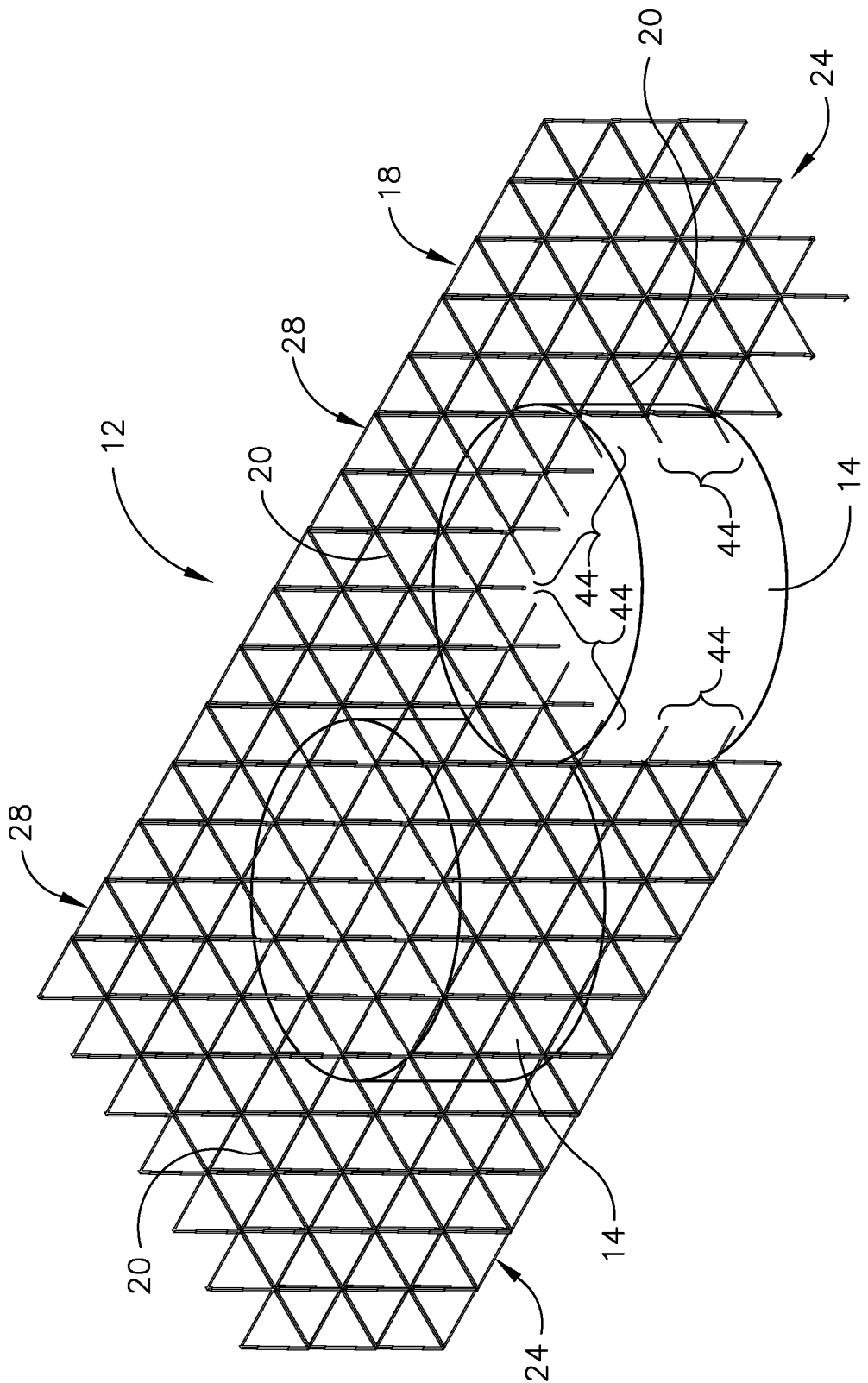
FIG. 10 is an top perspective partial cut away view of the core assembly fabricated in FIGS. 6 and 7.

In referring to FIG. 6, core assembly 12, as seen in FIGS. 8 and 10, is fabricated with polymer component 14 encasing mechanical fastener connector insert 16, which was fabricated in this configuration, for example, by way of utilizing photopolymer 32 as shown in FIG. 2 or by way of utilizing mold 40 as shown in FIG. 4. Polymer component 14 and mechanical fastener connector insert 16 are positioned within reservoir 30 within photopolymer 42 with material 33, as discussed earlier, positioned within an opening or cavity 34 of mechanical fastener connector insert 16 so as to block photopolymer resin from being positioned within that cavity 34 which could lead to interfering with a connection surface within cavity 34 which is employed in securing with a mechanical fastener.

Open cellular component 18 is formed from UV light 36' passing through openings (not shown) in mask 38' forming plurality of self-propagating photopolymer waveguides 20 or as also referred to as micro-trusses, as seen in FIG. 8 and as seen in FIG. 10 of first example of core assembly 12. In an alternative example, first face sheet 22 could also be positioned within the bottom of reservoir 30 with the growing the self-propagating photopolymer waveguides 20 such that waveguides 20 can secure to first face sheet 22. In another example polymer component 14 can be constructed within reservoir 30 using mask 38 as shown in FIG. 2 with replacing mask 38 with mask 38' and employing UV light 36' to grow micro-trusses or waveguides 20 as seen in FIG. 6 providing production time savings.

Figure 7:
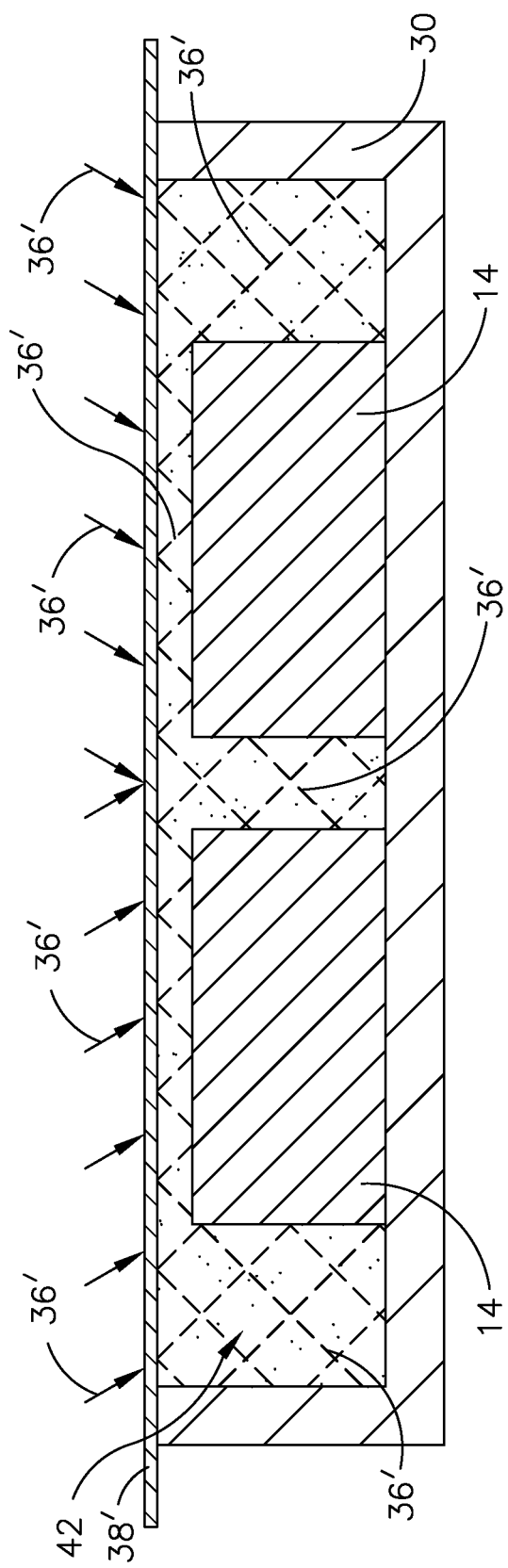
FIG. 7 is a cross section schematic view of a reservoir containing photopolymer and two polymer components and fabricating an open cellular component formed from a plurality of self-propagating photopolymer waveguides positioned around the polymer components.

In referring to FIG. 7, core assembly 12', as seen in FIG. 9 and would similarly appear as core assembly 12 as seen in FIG. 10, is being fabricated with polymer component 14, which was fabricated in this configuration by way of for example utilizing photopolymer 32 as shown in FIG. 3 or by way of utilizing mold 40 as shown in FIG. 5. Polymer component 14 is positioned within reservoir 30 within photopolymer 42 and open cellular component 18 is formed with UV light 36' passing through openings (not shown) in mask 38' forming plurality of self-propagating photopolymer waveguides 20 or also referred to as micro-trusses, as seen in FIG. 9 and second example core assembly 12' would similarly be configured as shown for core assembly 12 in FIG. 10. Also, in an alternative example, first face sheet 22 could be positioned within the bottom of reservoir 30 with the growing of the self-propagating photopolymer waveguides 20 such that waveguides 20 can secure to first face sheet 22. In another example polymer component 14 can be constructed within reservoir 30 using mask 38 as shown in FIG. 2 with replacing mask 38 with mask 38' and employing UV light 36' to grow micro-trusses or waveguides 20 as seen in FIG. 7 providing production time savings.

In fabricating core assembly 12, open cellular component 18, as seen in FIGS. 8 and 10, are formed as discussed above from a plurality of self-propagating photopolymer waveguides positioned around polymer component 14 wherein first portion 44 of plurality of self-propagating photopolymer waveguides 20 is secured to and extend from polymer component 14. In this example, plurality of self-propagating polymer waveguides 20 produce a networked three dimensional polymer micro-truss structure surrounding and bonding to polymer component 14, which encases mechanical fastener connector insert 16, and waveguides 20 bond to polymer component 14 providing a beneficial securement. In having polymer component 14 having an index of refraction sufficiently similar to the photopolymer 32 this will optimize formation and bonding of the micro-truss or waveguide 20 structures to polymer component 14. As will be further discussed herein, first portion 44 of self-propagating polymer waveguides 20 will be further bonded and secured to second face sheet 26 with respect to sandwich structure 10.

Similarly, in fabricating core assembly 12' open cellular component 18 as seen in FIG. 9, is formed as discussed above from a plurality of self-propagating photopolymer waveguides positioned around polymer component 14 wherein first portion 44 of plurality of self-propagating photopolymer waveguides 20 is secured to and extend from polymer component 14. First portion 44 of plurality of self-propagating photopolymer waveguides 20 are similarly positioned, arranged and connected to polymer component 14 as was described above for core assembly 12 and shown in FIG. 10. In this example, a plurality of self-propagating polymer waveguides 20 bond to polymer component 14 providing a beneficial securement. In having polymer component 14 having an index of refraction sufficiently similar to the photopolymer 32 this will optimize formation and bonding of the micro-truss or waveguide 20 structures to polymer component 14. As will be further discussed herein, first portion 44 of self-propagating polymer waveguides 20 will be further bonded and secured to second face sheet 26 with respect to sandwich structure 10.

Figure 11:
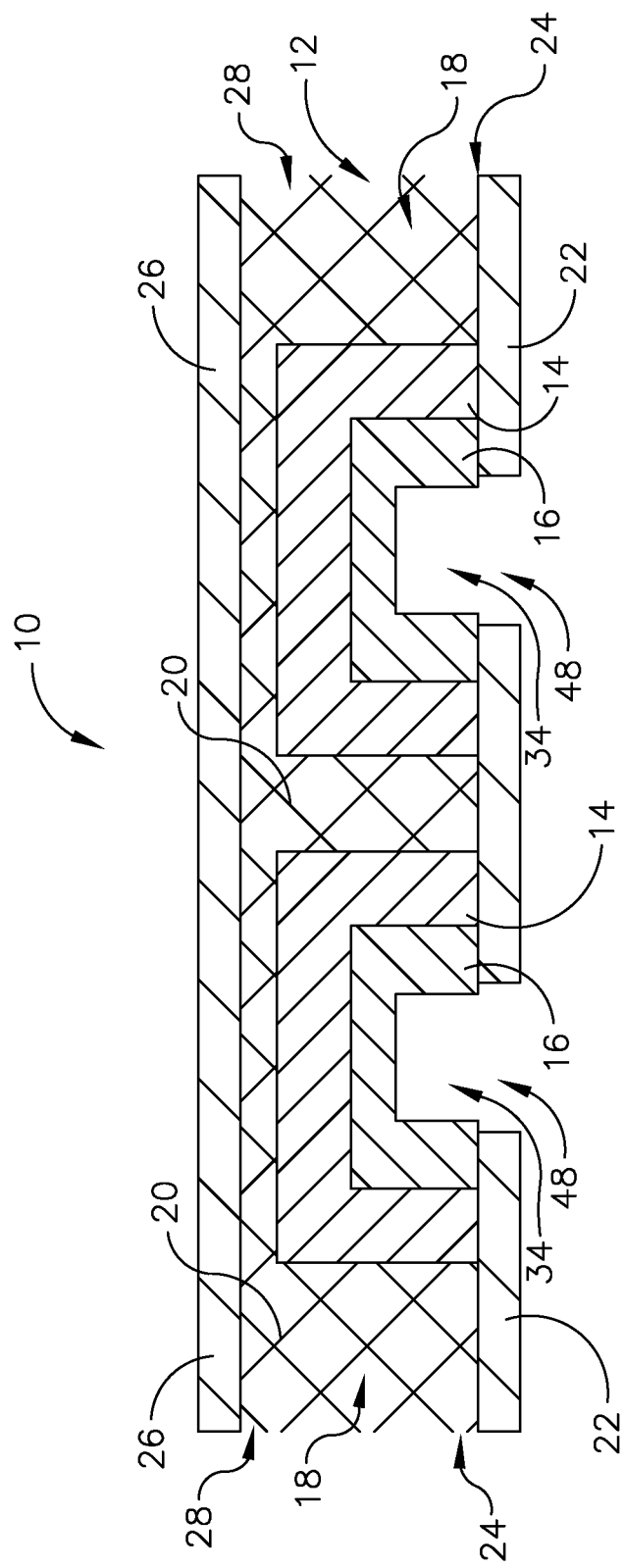
FIG. 11 is a schematic representation of the core assembly fabricated in FIG. 6 and shown in FIG. 8 with a first and second face sheet secured to the core assembly.

In referring to FIG. 11, core assembly 12 has first face sheet 22 secured to first side 24 of open cellular component 18 of core assembly 12. First face sheet 22, as mentioned earlier, can be constructed of one of many constructions. First face sheet 22 is secured to open cellular component or micro-truss core 18, for example, by dip or roll coating a layer of paste adhesive onto the exposed surface of open cellular component 18 and if needed also on first face sheet 22 and then placing first face sheet 22 onto this adhesive layer. The bond surface of first face sheet 22 may have a conversion coating primer or other adhesion promoter applied prior to the assembly operation. In other examples, other bonding or joining operations may be used to affix first face sheet 22 to open cellular component 18 including such operations, for example, as fusion welding, ultrasonic welding, adhesive film bonding, friction welding, spray adhesive bonding, interference fitting or mechanical attachment. It can be noted that these securement methodologies can be applied to securing second face sheet 26 to open cellular component 18. It is possible that the same or dissimilar methodologies of securement as mentioned above can be applied to each of the first and second face sheets 22, 26.

In the example shown in FIG. 11, first face sheet 22 defines hole(s) 48 which extend through and is defined by first face sheet 22 with hole(s) 48 aligned with at least a portion of mechanical fastener connector insert 16 such that a mechanical fastener can access mechanical fastener connector insert 16 for connecting and securing sandwich structure 10 to another structure or subsystem. As further seen in FIG. 11, first face sheet 22 is positioned in overlying relationship with polymer component 14 and is secured to secured to polymer component 14 with application by one of a wide variety of methodologies as described above for securing first face sheet 22 to open cellular component 18. In addition, in this example wherein first face sheet 22 is positioned in overlying relationship with at least a portion of mechanical fastener connector insert 16.

In referring to FIG. 11, second face sheet 26 is secured to second side 28 of open cellular component 18 of core assembly 12 as earlier described. First portion 44 of photopolymer waveguides or micro-trusses 20 each have distal ends 52, as seen in the example in FIG. 8, which are spaced apart from polymer component 14 and secured to second face sheet 26 as described earlier wherein second face sheet 26 is secured to open cellular component 18 with one of various securement methodologies. Second face sheet 26 can be, in other examples, secured directly to polymer component 14, in contrast to being spaced apart from polymer component 14 as seen in FIG. 11 with distal ends 52 are secured to second face sheet 26 as described earlier wherein second face sheet 26 is secured to open cellular component 18 with one of various securement methodologies. Second portion 54, as seen in FIG. 8, of plurality of self-propagating photopolymer waveguides 20 of open cellular component 18 extend between the first and second face sheets 22, 26 with first end 56 of each of the second portion 54 of the plurality of self-propagating photopolymer waveguides 20 secured to first face sheet 22 as described earlier wherein first face sheet 22 is secured to open cellular component 18 with various methodologies. Second end 58 of each of the second portion 54 of plurality of self-propagating photopolymer waveguides 20 of open cellular component 18 are secured to second face sheet 26 as described earlier wherein second face sheet 26 is secured to open cellular component 18 with one of various securement methodologies. Second portion 54 of plurality of self-propagating photopolymer waveguides 20 which extend between first and second face sheets 22, 26 provide support between first and second face sheets 22, 26. The network of the plurality of waveguides 20 can be increased in density as needed for structural support in areas of sandwich structure 10 which will experience load demands.

Figure 12:
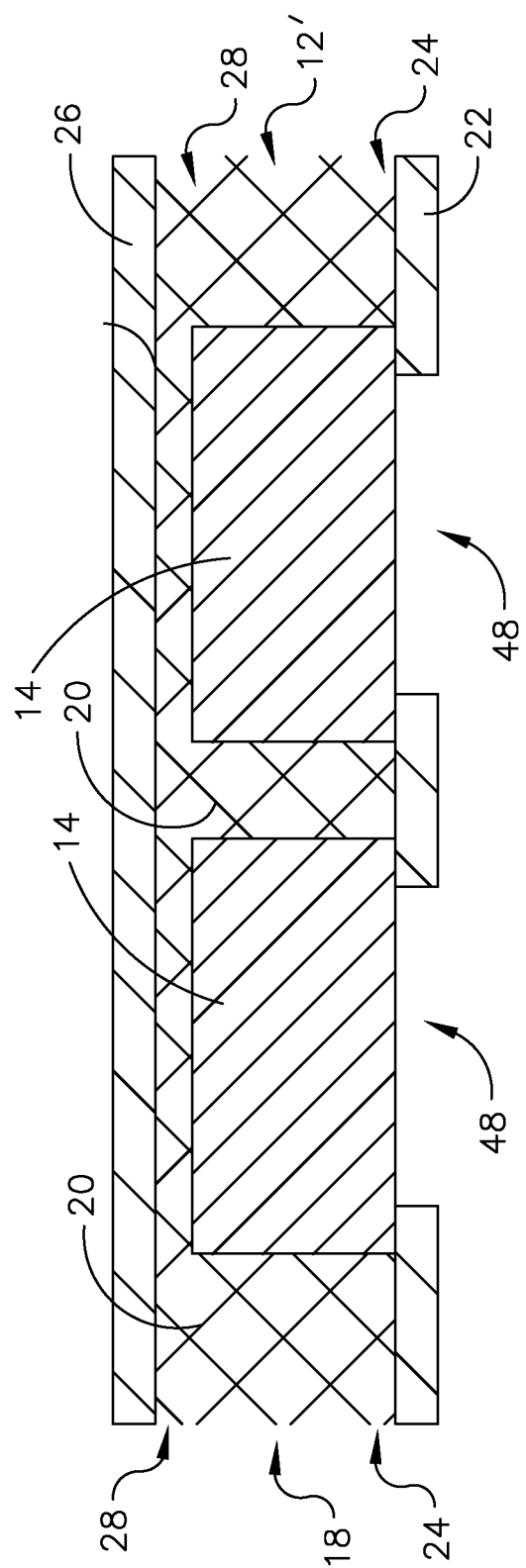
FIG. 12 is a schematic representation the core assembly fabricated in FIG. 7 and shown in FIG. 9 with a first and second face sheet secured to the core assembly.

In referring to FIG. 12, core assembly 12' has first face sheet 22 secured to first side 24 of open cellular component 18 of core assembly 12'. First face sheet 22 as mentioned earlier can be constructed of one of many constructions. First face sheet 22 can be secured, as mentioned above, to open cellular component or micro-truss core 18 for example by dip or roll coating a layer of paste adhesive onto the exposed surface of open cellular component 18 and if needed also on first face sheet 22 and then placing first face sheet 22 onto this adhesive layer. The bond surface of first face sheet 22 may have a conversion coating primer or other adhesion promoter applied prior to the assembly operation. In other examples, other bonding or joining operations may be used to affix first face sheet 22 to open cellular component 18 including such operations, for example, as fusion welding, ultrasonic welding, adhesive film bonding, friction welding, spray adhesive bonding, interference fitting or mechanical attachment. It can be noted that one of these securement methodologies can be applied to securing second face sheet 26 to second side 28 of open cellular component 18. It is possible that the same or dissimilar methodologies of securement as mentioned above can be applied to each of the first and second face sheets 22, 26.

Figure 13:
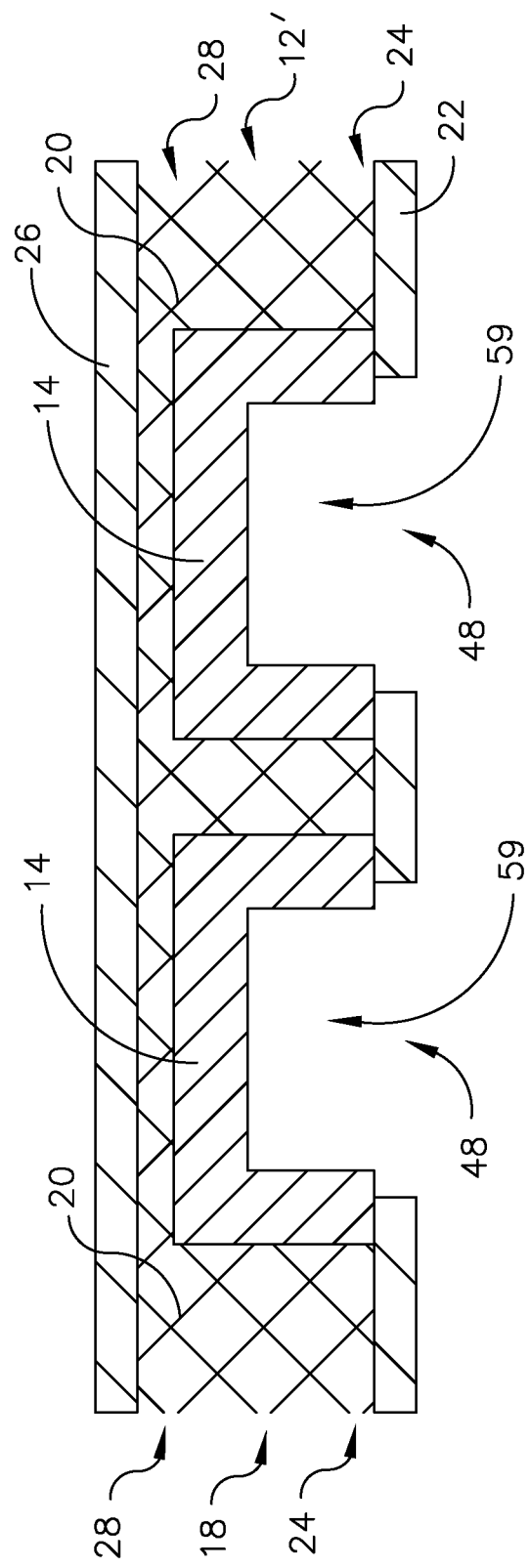
FIG. 13 is the core assembly of FIG. 12 wherein a hole has been positioned within each polymer component.
Figure 14:
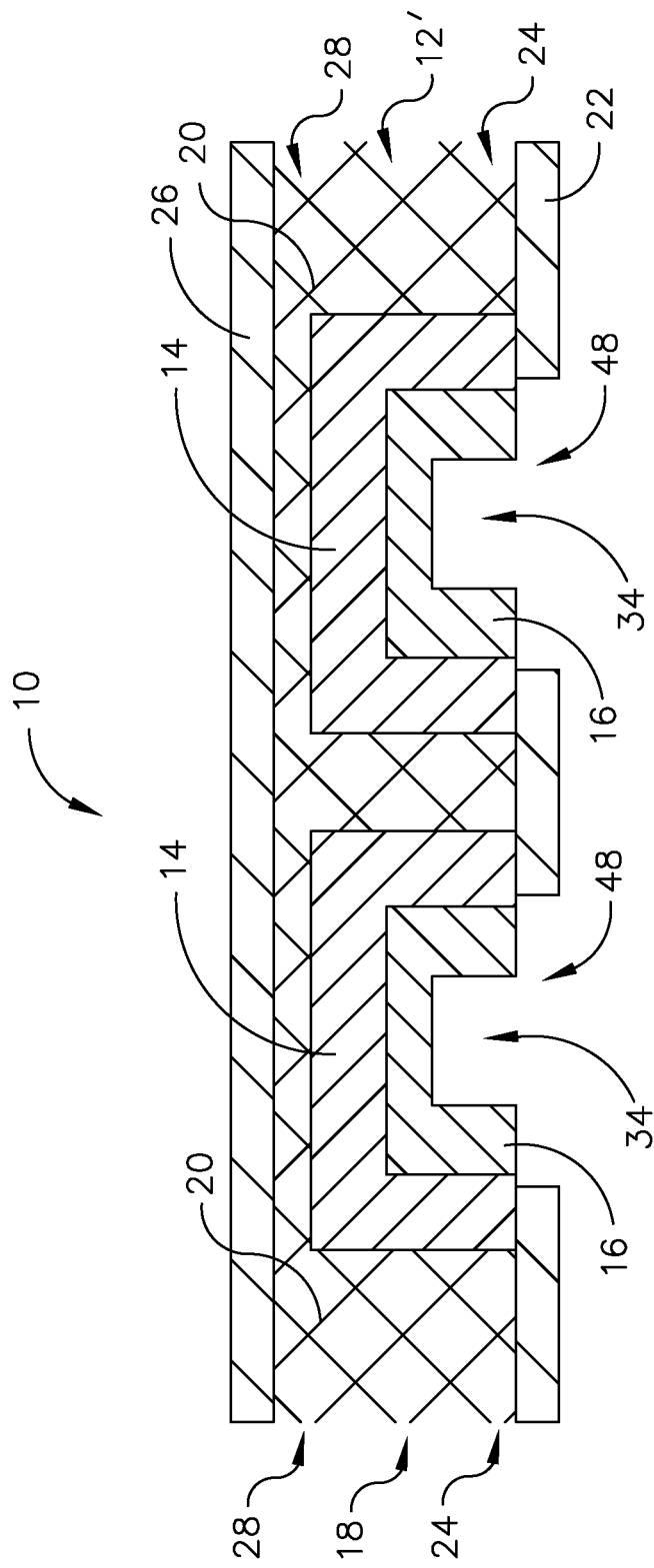
FIG. 14 is the core assembly of FIG. 13 wherein a mechanical fastener connector insert has been secured within each hole positioned within each polymer component.

In the example shown in FIG. 12, first face sheet 22 defines hole(s) 48 which extend through and is defined by first face sheet 22. Hole(s) 48 can be fabricated into first face sheet 22 or can be drilled in first face sheet 22 with first face sheet 22 secured to core assembly 12'. Hole 48 which extends through first face sheet 22 is in alignment with polymer component 14 wherein hole 59 is positioned by way of drilling or otherwise being positioned within polymer component 14, as seen in FIG. 13. Mechanical fastener connector insert 16 is positioned within hole 59 and is secured to polymer component 14 within hole 59 as seen in FIG. 14. Securement of mechanical fastener connector insert 16 can be achieved by use of a wide variety of adhesives for example such an epoxy resin, phenols, acrylates, vinyl esters and other like adhesives. Hole 48 which extends through first face sheet 22 is aligned with polymer component 14 and mechanical fastener connector insert 16 which is positioned within hole 59 defined by polymer component 14. Mechanical fastener connector insert 16 is easily accessible through first face sheet 22 for securing to a compatible mechanical fastener through hole 48.

As further seen in FIG. 12, first face sheet 22 is positioned in overlying relationship with polymer component 14 and is secured to secured to polymer component 14 with application by one of a wide variety of methodologies as described above for securing first face sheet 22 to open cellular component 18. Second face sheet 26 is secured to second side 28 of open cellular component 18 of core assembly 12 as earlier described, which includes another example wherein polymer component 14 is secured directly to second face sheet 26 in contrast to being spaced apart from polymer component 14 as seen in FIG. 12. First portion 44 of photopolymer waveguides or micro-trusses 20 each have distal ends 52, as seen in FIG. 9, are spaced apart from polymer component 14 and secured to second face sheet 26 as described earlier wherein second face sheet 26 is secured to open cellular component 18 with one of the various securement methodologies. Second portion 54, as seen in FIG. 9, of plurality of self-propagating photopolymer waveguides 20 of open cellular component 18 extend between the first and second face sheets 22, 26 with first end 56 of each of the second portion 54 of the plurality of self-propagating photopolymer waveguides 20 secured to first face sheet 22 as described earlier wherein first face sheet 22 is secured to open cellular component 18 with one of the various securement methodologies. Second end 58 of each of the second portion 54 of plurality of self-propagating photopolymer waveguides 20 of open cellular component 18 are secured to second face sheet 26 as described earlier wherein second face sheet 26 is secured to open cellular component 18 with one of the various securement methodologies. Second portion 54 of plurality of self-propagating photopolymer waveguides 20 which extend between first and second face sheets 22, 26 provide support between first and second face sheets 22, 26. The network of the plurality of waveguides 20 can be increased in density as needed for structural support in areas of sandwich structure 10 which will experience load demands.

Figure 15:
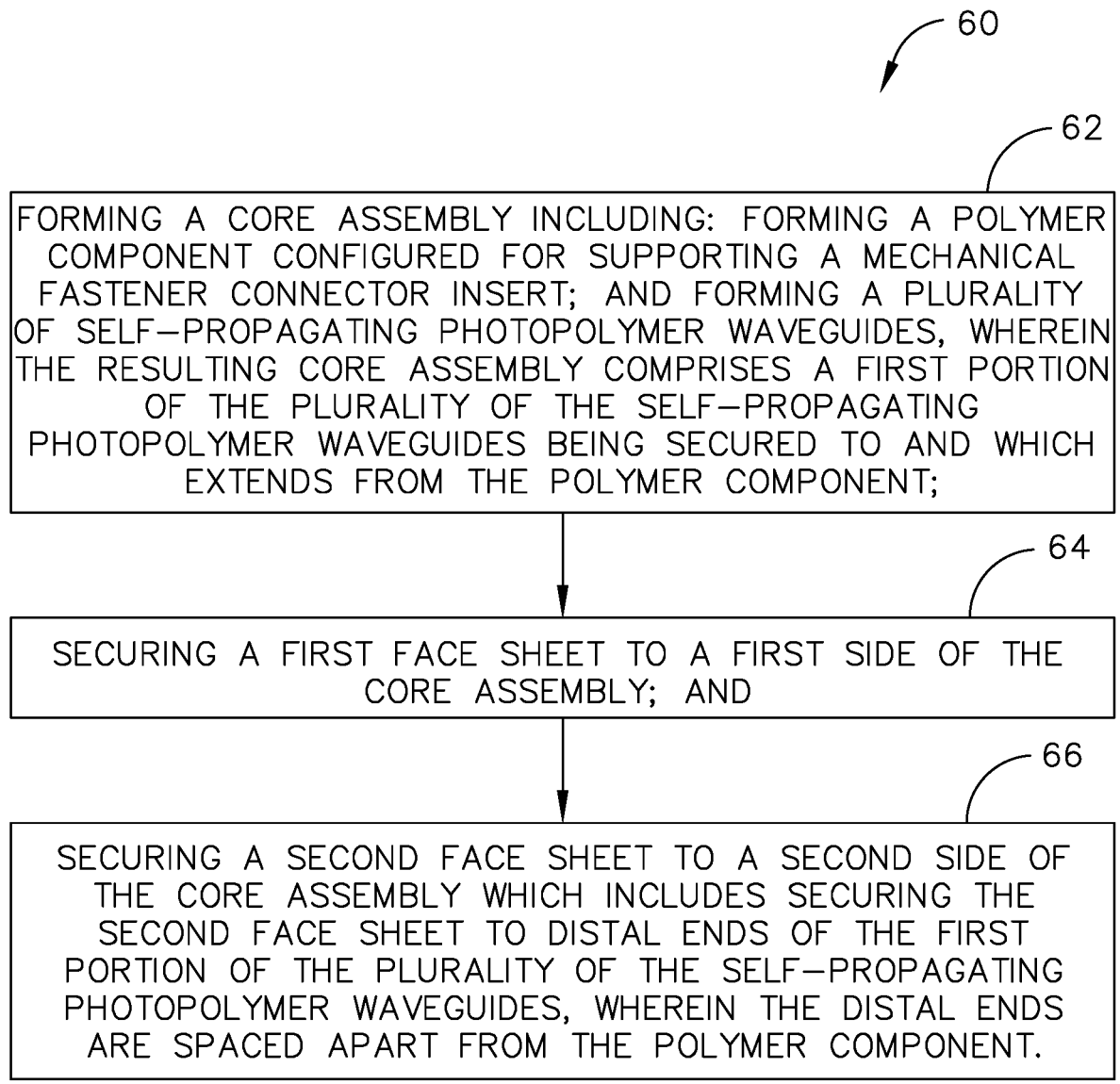
FIG. 15 is a flow chart of a method for fabricating a sandwich structure configured to be secured with a mechanical fastener.

In referring to FIG. 15, method 60 for fabricating sandwich structure 10 for securement with a mechanical fastener includes step 62 forming core assembly 12 including forming polymer component 14 configured for supporting mechanical fastener connector insert 16 and forming plurality of self-propagating photopolymer waveguides 20. The resulting core assembly 12 includes first portion 44 of plurality of the self-propagating photopolymer waveguides 20 being secured to and which extends from polymer component 14. Method 60 further includes step 64 of securing first face sheet 22 to first side 24 of core assembly 12. Method 60 also includes step 66 of securing second face sheet 26 to second side 28 of core assembly 12, which includes securing second face sheet 26 to distal ends 52 of first portion 44 of plurality of the self-propagating photopolymer waveguides 20, wherein distal ends 52 are spaced apart from polymer component 14.

Step 62 of forming core assembly 12 further including the step of forming polymer component 14 configured for supporting the mechanical fastener connector insert 16, which includes placing a polymer into mold 40 and curing the polymer. This step of forming polymer component 14 further includes positioning mechanical fastener connector insert 16 within the polymer positioned within mold 40 prior to curing the polymer such that mechanical fastener connector insert 16 is encased within polymer component 14 when the polymer is cured. Step 62 of forming core assembly 12 further includes the step of forming the plurality of self-propagating photopolymer waveguides 20 including positioning polymer component 14 within reservoir 30 of a photopolymer 42 and exposing photopolymer 42 to UV light 36' such as UV light from a UV light source forming plurality of self-propagating photopolymer waveguides 20.

The step of forming the plurality of the plurality of self-propagating photopolymer waveguides 20 also includes forming a second portion 54 of self-propagating photopolymer waveguides 20 which extends through photopolymer 42 such that second portion 54 is spaced apart from polymer component 14, and wherein each self-propagating photopolymer waveguide 20 of second portion 54 of the plurality of self-propagating photopolymer waveguides 20 has first end 56 for securing to first face sheet 22 and second end 58 for securing to second face sheet 26.

Step 64 of securing first face sheet 22 to first side 24 of the core assembly 12 includes positioning hole 48 defined by and which extends through first face sheet 22 in alignment with at least a portion of mechanical fastener connector insert 16. Step 64 further includes securing first face sheet 22 to first side 24 of core assembly 12 includes positioning hole 48 defined by first face sheet 22 in alignment with polymer component 14. Further included is drilling hole 59 in polymer component 14 in alignment with hole 48 defined by first face sheet 22 and securing mechanical fastener connector insert 16 within hole 48 of polymer component 14.

The step of forming core assembly 12' includes forming polymer component 14 configured for supporting mechanical fastener connector insert 16 including a step of exposing reservoir 30 of photopolymer 32 to light for forming polymer component 14. Step 64 of securing first face sheet 22 to first side 24 of core assembly 12 includes positioning hole 48 defined by first face sheet 22 in alignment with polymer component 14 and drilling hole 59 in polymer component 14 in alignment with hole 48 defined by first face sheet 22. With hole 59 positioned within polymer component 14 securing mechanical fastener connector insert 16 within hole 59 of polymer component 14 can be accomplished.

The step exposing the reservoir 30 of photopolymer 32 to light 36 further includes a step of positioning mechanical fastener connector insert 16 within reservoir 30 for forming polymer component 14, thereby encasing mechanical fastener connector insert 16 in photopolymer 32. Step 64 of securing first face sheet 22 to first side 24 of core assembly 12 includes positioning hole 48 defined by and which extends through first face sheet 22 to be in alignment with mechanical fastener connector insert 16.

While various embodiments have been described above, this disclosure is not intended to be limited thereto. Variations can be made to the disclosed embodiments that are still within the scope of the appended claims.

What is claimed:

1. A sandwich structure configured to be secured with a mechanical fastener, the sandwich structure comprising:
    a core assembly, comprising:
        a first side and a second side, opposite each other;
        a polymer component;
        a mechanical fastener connector insert, secured within the polymer component; and
        an open cellular component formed from a plurality of self-propagating photopolymer waveguides, wherein:
            the plurality of self-propagating photopolymer waveguides is positioned around the polymer component; and
            a subset of the plurality of self-propagating photopolymer waveguides is secured to and extends from the polymer component;
    a first face sheet, secured to the first side of the core assembly; and
    a second face sheet secured to the second side of the core assembly, wherein each one of the subset of the plurality of self-propagating photopolymer waveguides has a distal end, spaced apart from the polymer component and secured to the second face sheet.

2. The sandwich structure of claim 1, wherein the mechanical fastener connector insert is encased within the polymer component as a result of curing of a polymer within a mold, containing the mechanical fastener.

3. The sandwich structure of claim 1, wherein the polymer component comprises a photopolymer material.

4. The sandwich structure of claim 1, wherein:
    the first face sheet has a hole, which extends through the first face sheet; and
    the hole is aligned with the mechanical fastener connector insert.

5. The sandwich structure of claim 1, wherein the first face sheet and the polymer component are positioned in an overlying relationship with respect to one another.

6. The sandwich structure of claim 1, wherein the first face sheet and at least a portion of the mechanical fastener connector insert are positioned in overlying relationship with respect to one another.

7. The sandwich structure of claim 1, wherein a second subset of the plurality of self-propagating photopolymer waveguides extends between the first face sheet and the second face sheet, with a first end of each one of the second subset of the plurality of self-propagating photopolymer waveguides, secured to the first face sheet, and with a second end of each one of the second subset of the plurality of self-propagating photopolymer waveguides, secured to the second face sheet.

8. The sandwich structure of claim 1, wherein:
    the polymer component comprises a hole; and
    the first face sheet comprises a hole, which extends through the first face sheet.

9. The sandwich structure of claim 8, wherein
    the hole, which extends through the first face sheet, is aligned with the hole in the polymer component.

10. A method for fabricating a sandwich structure for securement with a mechanical fastener, the method comprising steps of:
    forming a core assembly, which comprises a first side and a second side, opposite each other, wherein the step of forming the core assembly comprises:
        forming a polymer component; and
        forming a plurality of self-propagating photopolymer waveguides, wherein a subset of the plurality of self-propagating photopolymer waveguides is secured to and extends from the polymer component;
    securing a mechanical fastener connector insert within the polymer component;
    securing a first face sheet to the first side of the core assembly; and
    securing a second face sheet to the second side of the core assembly, wherein the step of securing the second face sheet to the second side of the core assembly comprises securing the second face sheet to distal ends of each of the plurality of self-propagating photopolymer waveguides of the subset of the plurality of self-propagating photopolymer waveguides, and wherein the distal ends of each of the plurality of self-propagating photopolymer waveguides of the subset of the plurality of self-propagating photopolymer waveguides are spaced apart from the polymer component.

11. The method of claim 10, wherein the step of forming the polymer component, configured for supporting the mechanical fastener connector insert, comprises placing a polymer into a mold.

12. The method of claim 11, wherein the step of forming the polymer component further comprises positioning the mechanical fastener connector insert within the polymer, positioned within the mold prior to curing the polymer, such that the mechanical fastener connector insert is encased within the polymer component when the polymer is cured.

13. The method of claim 10, wherein the step of forming the plurality of self-propagating photopolymer waveguides comprises positioning the polymer component within a reservoir of a photopolymer and exposing the photopolymer to light so that the plurality of self-propagating photopolymer waveguides is formed.

14. The method of claim 13, wherein:
    the step of forming the core assembly comprises forming the plurality of self-propagating photopolymer waveguides, the plurality of self-propagating photopolymer waveguides comprises:

a second subset of the plurality of self-propagating photopolymer waveguides, which extends through the photopolymer such that the second subset of the plurality of self-propagating photopolymer waveguides is spaced apart from the polymer component; and each one of the second subset of the plurality of self-propagating photopolymer waveguides has a first end for securing to the first face sheet and a second end for securing to the second face sheet.

15. The method of claim 14, wherein the step of securing the first face sheet to the first side of the core assembly comprises positioning a hole, which extends through the first face sheet, in alignment with the mechanical fastener connector insert.

16. The method of claim 10, wherein the step of securing the first face sheet to the first side of the core assembly comprises:

positioning a hole that extends through the first face sheet in alignment with the polymer component;

drilling a hole in the polymer component so that the hole is aligned with the hole that extends through the first face sheet; and securing the mechanical fastener connector insert within the hole of the polymer component.

17. The method of claim 10, wherein the step of forming the core assembly comprises a step of exposing a reservoir of photopolymer to UV light for forming the polymer component.

18. The method of claim 17, wherein the step of securing the first face sheet to the first side of the core assembly comprises:

positioning a hole that extends through the first face sheet in alignment with the polymer component;

drilling a hole in the polymer component so that the hole is aligned with the hole that extends through the first face sheet; and securing the mechanical fastener connector insert within the hole in the polymer component.

19. The method of claim 17, wherein the step of exposing the reservoir of photopolymer to the UV light further comprises a step of positioning the mechanical fastener connector insert within the reservoir of photopolymer and forming the polymer component such that the polymer component encases the mechanical fastener connector insert.

20. The method of claim 19, wherein the step of securing the first face sheet to the first side of the core assembly comprises positioning a hole, which extends through the first face sheet, to be in alignment with the mechanical fastener connector insert.

21. The sandwiched structure of claim 2, wherein the mechanical fastener connector insert comprises a roughened surface.

* * * * *

UNITED STATES PATENT AND TRADEMARK OFFICE
CERTIFICATE OF CORRECTION

PATENT NO. : 11,104,096 B2  
APPLICATION NO. : 16/117676  
DATED : August 31, 2021  
INVENTOR(S) : Hundley et al.

Page 1 of 1

It is certified that error appears in the above-identified patent and that said Letters Patent is hereby corrected as shown below:

In the Claims

At Column 11, Line 38, "component" should be -- component, --.

At Column 11, Line 49, "sheet" should be -- sheet, --.

At Column 12, Line 3, "in" should be -- in an --.

At Column 12, Line 18, "wherein" should be -- wherein: --.

At Column 14, Line 25, "sandwiched" should be -- sandwich --.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*